United States Patent
Akhouri et al.

(10) Patent No.: US 10,917,323 B2
(45) Date of Patent: Feb. 9, 2021

(54) SYSTEM AND METHOD FOR MANAGING A REMOTE OFFICE BRANCH OFFICE LOCATION IN A VIRTUALIZED ENVIRONMENT

(71) Applicant: Nutanix, Inc., San Jose, CA (US)

(72) Inventors: Aashish Akhouri, San Ramon, CA (US); Amit Jain, San Jose, CA (US); Karan Gupta, San Jose, CA (US); Suresh Sivaprakasam, Cupertino, CA (US)

(73) Assignee: NUTANIX, INC., San Jose, CA (US)

( * ) Notice: Subject to any disclaimer, the term of this patent is extended or adjusted under 35 U.S.C. 154(b) by 129 days.

(21) Appl. No.: 16/177,161

(22) Filed: Oct. 31, 2018

(65) Prior Publication Data
US 2020/0136948 A1   Apr. 30, 2020

(51) Int. Cl.
*H04L 12/26* (2006.01)
*H04L 29/06* (2006.01)
*G06F 9/455* (2018.01)

(52) U.S. Cl.
CPC ...... *H04L 43/0852* (2013.01); *G06F 9/45558* (2013.01); *H04L 63/1425* (2013.01); *G06F 2009/45562* (2013.01); *G06F 2009/45591* (2013.01); *G06F 2009/45595* (2013.01)

(58) Field of Classification Search
CPC . H04L 43/0852; H04L 63/1425; H04L 43/04; H04L 41/044; G06F 9/45558; G06F 2009/45562; G06F 2009/45595; G06F 2009/45591
See application file for complete search history.

(56) References Cited

U.S. PATENT DOCUMENTS

| | | | |
|---|---|---|---|
| 7,617,322 B2 | 11/2009 | Ahmed et al. | |
| 7,843,815 B2 * | 11/2010 | Znamova | H04J 3/0682 370/229 |
| 8,180,734 B1 | 5/2012 | Thilmony et al. | |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Jimmy H Tran
(74) *Attorney, Agent, or Firm* — Foley & Lardner LLP

(57) ABSTRACT

A system and method for transmitting data from a local management system of a remote office branch office site in a virtual computing system to a central management system includes assigning, by the local management system, an initial priority to each piece of data, identifying data requested by the central management system since a previous data transmission, and updating the initial priority of each piece of data to an updated priority. The data requested by the central management system is prioritized higher than other data. The system and method also include combining, by the local management system, at least a portion of the data starting with data having a highest priority, into a data packet until the data packet achieves a computed data packet size, transmitting the data packet to the central management system, and updating the initial priority with the updated priority for future data transmissions.

22 Claims, 5 Drawing Sheets

(56) References Cited

U.S. PATENT DOCUMENTS

| | | | |
|---|---|---|---|
| 8,379,865 | B2 | 2/2013 | Frindell et al. |
| 8,549,518 | B1 | 10/2013 | Aron et al. |
| 8,601,473 | B1 | 12/2013 | Aron et al. |
| 8,850,130 | B1 | 9/2014 | Aron et al. |
| 9,288,162 | B2 | 3/2016 | Nellikar et al. |
| 9,461,923 | B2* | 10/2016 | Li .................... H04L 41/5019 |
| 9,772,866 | B1 | 9/2017 | Aron et al. |
| 2002/0093982 | A1* | 7/2002 | Joy ..................... H04L 67/325 370/468 |
| 2002/0186660 | A1* | 12/2002 | Bahadiroglu .......... H04L 29/06 370/248 |
| 2003/0018753 | A1 | 1/2003 | Seki |
| 2003/0041165 | A1* | 2/2003 | Spencer ............ H04L 47/2416 709/233 |
| 2007/0064669 | A1* | 3/2007 | Classon ............... H04L 1/1822 370/347 |
| 2007/0217343 | A1* | 9/2007 | Znamova ................ H04L 41/00 370/252 |
| 2010/0085966 | A1* | 4/2010 | Samuels ............. H03M 7/3084 370/389 |
| 2010/0095021 | A1* | 4/2010 | Samuels ................ H04L 47/70 709/235 |
| 2010/0202298 | A1 | 8/2010 | Agarwal et al. |
| 2010/0257263 | A1 | 10/2010 | Casado et al. |
| 2010/0333116 | A1* | 12/2010 | Prahlad .............. G06Q 30/0206 719/328 |
| 2013/0023274 | A1* | 1/2013 | Meredith ............. H04W 72/02 455/450 |
| 2013/0080638 | A1 | 3/2013 | Di Benedetto et al. |
| 2013/0158686 | A1* | 6/2013 | Zhang ................. A61B 5/1123 700/91 |
| 2013/0331091 | A1* | 12/2013 | Chang .................. H04W 52/02 455/423 |
| 2015/0058448 | A1* | 2/2015 | Proctor ................ H04L 65/602 709/219 |
| 2015/0163152 | A1* | 6/2015 | Li ....................... H04L 41/5019 370/409 |
| 2015/0172314 | A1* | 6/2015 | Mononen ........... H04L 63/1416 726/8 |
| 2015/0271255 | A1* | 9/2015 | Mackay ................ H04L 67/101 709/226 |
| 2015/0278024 | A1* | 10/2015 | Barman .............. G06F 11/1466 707/634 |
| 2016/0006837 | A1* | 1/2016 | Reynolds ................ H04L 69/14 709/203 |
| 2016/0088550 | A1* | 3/2016 | Rabii .................... H04W 72/02 370/310 |
| 2016/0261493 | A1* | 9/2016 | Li ........................... H04L 43/50 |
| 2016/0294628 | A1* | 10/2016 | Riddle .................... H04L 47/78 |
| 2017/0126345 | A1* | 5/2017 | Testicioglu ......... H04L 47/6215 |
| 2017/0214625 | A1* | 7/2017 | Dhanabalan ........ H04L 47/2433 |
| 2017/0310692 | A1* | 10/2017 | Ackerman .......... H04L 63/1425 |
| 2017/0317937 | A1* | 11/2017 | Dillon .................... H04L 47/24 |
| 2018/0041439 | A1* | 2/2018 | Dhanabalan ............ H04L 69/04 |
| 2018/0270139 | A1* | 9/2018 | Singh ..................... H04L 43/16 |
| 2018/0349168 | A1* | 12/2018 | Ahmed ............... G06F 11/3452 |
| 2019/0158371 | A1* | 5/2019 | Dillon .................. H04L 47/215 |
| 2020/0136948 | A1* | 4/2020 | Akhouri ............. H04L 63/1425 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

SYSTEM AND METHOD FOR MANAGING A REMOTE OFFICE BRANCH OFFICE LOCATION IN A VIRTUALIZED ENVIRONMENT

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present day virtual computing systems have limitations due to their configuration and the way they operate.

SUMMARY

In accordance with some aspects of the present disclosure, a method is disclosed. The method includes receiving, by a local management system of a remote office branch office site in a virtual computing system, data from one or more nodes of the remote office branch office site, assigning, by the local management system, an initial priority to each piece of the data that is received, and identifying, by the local management system, the data requested by a central management system of the virtual computing system from the local management system since a previous data transmission. The method also includes updating, by the local management system, the initial priority of each piece of the data to an updated priority, such that the data requested by the central management system since the previous data transmission is prioritized higher than other data, combining, by the local management system, at least a portion of the data starting with the data having a highest priority, into a data packet until the data packet achieves a computed data packet size, and transmitting, by the local management system, the data packet to the central management system. The method further includes updating, by the local management system, the initial priority with the updated priority for future data transmissions to the central management system.

In accordance with some more aspects of the present disclosure, another method is disclosed. The method includes computing, by a local management system of a remote office branch office site in a virtual computing system, a frequency with which to transmit data received from one or more nodes of the remote office branch office site to a central management system, such that the local management system is connected to the central management system via a network link. The method also includes computing, by the local management system, a data packet size for determining an amount of data to be transmitted to the central management system and transmitting, by the local management system, a data packet of the data packet size from the local management system to the central management system based on the frequency, wherein the data packet includes at least a portion of the data that the central management system previously requested. The local management system computes the frequency based upon a previous instance of the network link being connected to transmit the data packet from the local management system to the central management system and the local management system computes the data packet size by dividing a bandwidth of the network link with a maximum latency of the network link.

In accordance with some other aspects of the present disclosure, a system is disclosed. The system includes a remote office branch office site having a local management system and one or more nodes, a central management system in communication with the remote office branch office site via the local management system, and a network link connecting the local management system to the central management system. The local management system includes a memory to store data received from the one or more nodes and a processing unit configured to assign an initial priority to each piece of the data that is received, identify the data requested by the central management system from the local management system since a previous data transmission, and update the initial priority of each piece of the data to an updated priority such that the data requested by the central management system since the previous data transmission is prioritized higher than other data. The processing unit is also configured to combine at least a portion of the data, starting with the data having a highest priority, into a data packet until the data packet achieves a computed data packet size, transmit the data packet to the central management system, and update the initial priority with the updated priority for future data transmissions to the central management system.

In accordance with yet other aspects of the present disclosure, a non-transitory computer readable media with computer-executable instructions embodied thereon is disclosed. The instructions when executed by a processor of a local management system of a remote office branch office site in a virtual computing system perform a process. The process includes receiving data from one or more nodes of the remote office branch office site, assigning an initial priority to each piece of the data, and identifying the data requested by a central management system of the virtual computing system from the local management system since a previous data transmission. The process also includes updating the initial priority of each piece of the data to an updated priority, wherein the data requested by the central management system since the previous data transmission is prioritized higher than other data, combining at least a portion of the data, starting with the data having a highest priority, into a data packet until the data packet achieves a computed data packet size, and transmitting the data packet to the central management system. The process additionally includes updating the initial priority with the updated priority for future data transmissions to the central management system.

In accordance with yet other aspects of the present disclosure, a method is disclosed. The method includes receiving, by a central management system associated with a remote office branch office site in a virtual computing system, data from a local management system of the remote office branch office site, identifying, by the central management system, an abnormal behavior of a component of the remote office branch office site from the data, such that the abnormal behavior is based upon deviations from historical data, and determining, by the central management system, that the data is down sampled data. The method also includes determining, by the central management system, a window of time period of the down sampled data from which to request raw data, receiving, by the central management system, the raw data from the window of time period from the local management system, and resolving, by the central management system, the abnormal behavior from the raw data.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
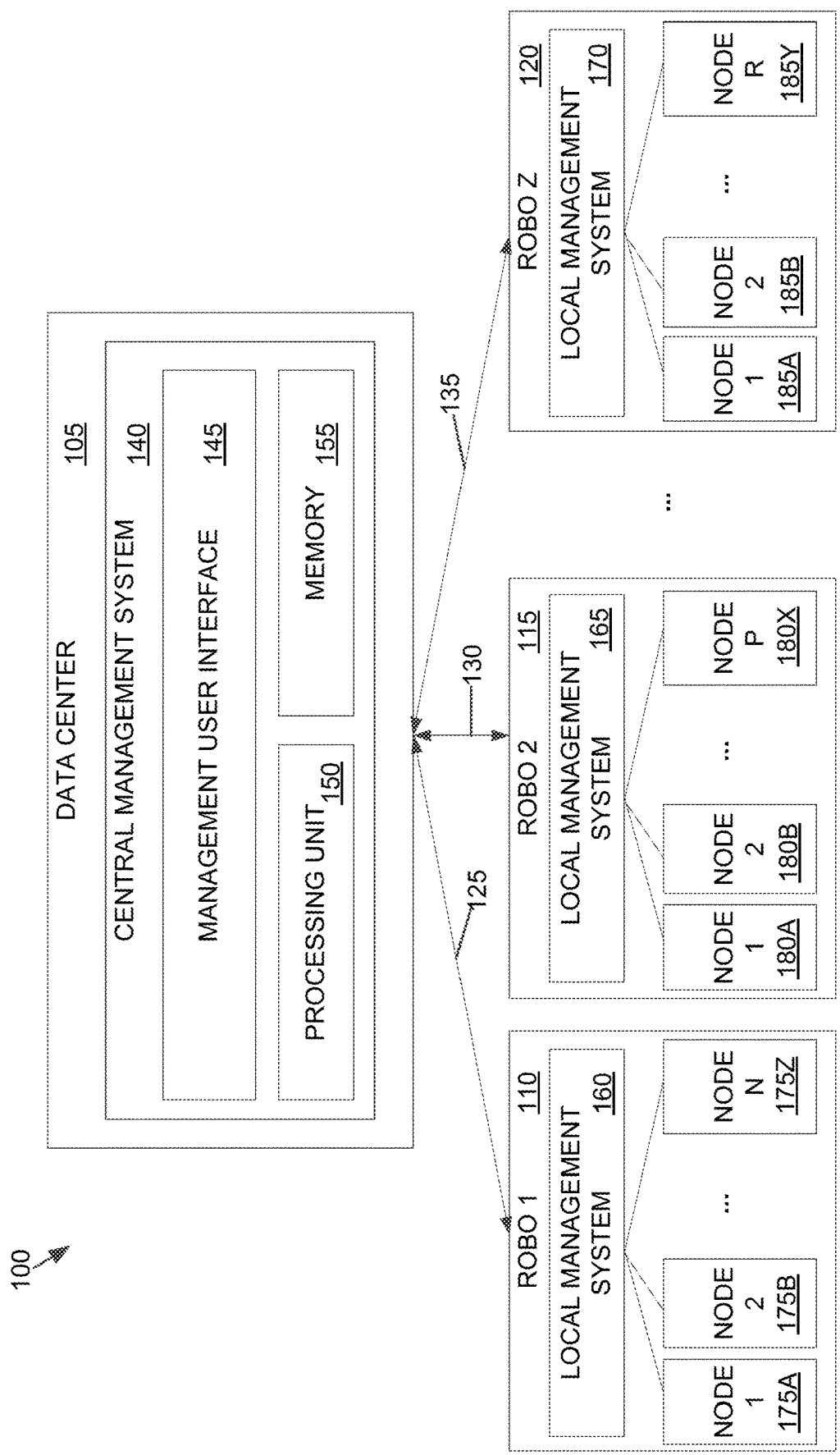
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a virtual computing system having a plurality of clusters, with each of the plurality of clusters having a plurality of nodes. Each of the plurality of nodes includes one or more virtual machines and other entities managed by an instance of a monitor such as a hypervisor. These and other components may be part of a datacenter, which may be managed by a user (e.g., an administrator or other authorized personnel). The virtual computing system may also include one or more Remote Office Branch Office ("ROBO") sites, each of which may also include one or more clusters having one or more nodes with virtual machines and other entities. Each of the ROBO sites may be configured to collect a variety of data from the underlying nodes and transmit that data to the datacenter for further analysis, to manage and operate the ROBO sites.

Each of the ROBO sites may be connected to the datacenter via a network link. The transmission of data from each of the ROBO sites to the datacenter may be facilitated via the network link. The data may be transmitted from each ROBO site to the datacenter at fixed intervals of times or instantaneously as the data is collected. However, transmission of data at fixed intervals or instantaneously may adversely impact the operation of the ROBO sites and the datacenter. For example, the transmission may compete with other more critical data/instructions being transmitted between the ROBO sites and the datacenter for the use of the network link. Since the network link is characterized by a pre-determined bandwidth, by sending too much data at the same time, only some of the data may be successfully transmitted or the transmission may fail all together. Thus, the data may need to be transmitted multiple times for a successful transmission, thereby devoting time and resources of the ROBO sites and the datacenter that may be used or needed for other more critical tasks. Further, the network link is a paid resource. Typically, customers pay for using the network link. The cost of using the network link may be higher at certain times than others. By transmitting data at fixed intervals of times or instantaneously as the data is collected, the ROBO sites may be transmitting data when the cost of using the network link is higher, thereby incurring significant expense to the customer.

Additionally, when data is transmitted from the ROBO sites to the datacenter, all of the data that is collected since a previous transmission may be transmitted. The datacenter may not need all of the data that is sent by the ROBO sites to manage and operate the ROBO sites. Transmitting all of the data collected since a previous transmission not only takes time, it increases the cost of using the network link, consumes storage space at the datacenter that may otherwise be used for other purposes, and requires time and resources of the datacenter that may otherwise be used for other pressing needs. Thus, transmitting all of the collected data to the datacenter is inefficient, time consuming, and adversely impacts the operation of the datacenter.

The present disclosure presents technical solutions. Specifically, the present disclosure provides an efficient mechanism of transmitting data from the ROBO sites to the datacenter that takes advantage of the characteristics of the network link and prioritizes transmission of data that is more relevant for the datacenter. Thus, instead of transmitting data at fixed intervals or instantaneously, each of the ROBO sites is configured with the ability to automatically determine a frequency of transmission based upon the characteristics (e.g., bandwidth, latency, and connection type) of the network link. The ROBO sites are also configured to transmit data at times when using the network link is cheaper and when the network link is less likely to be used for transmission of other more critical data/instructions.

Additionally, each of the ROBO sites may be configured to prioritize data to be sent to the datacenter and further configured to reduce the amount of data being sent in each transmission. Specifically, the ROBO sites may identify the data that is more relevant to the datacenter and prioritize the transmission of that data first. The ROBO sites may also detect anomalies in the underlying data and prioritize the sending of the anomalous data to the datacenter. The ROBO sites may also prioritize customer data (e.g., the entity owning, managing, or otherwise operating the datacenter) over data collected by the ROBO sites. The ROBO sites may also be configured to down sample data that is sent to the datacenter to reduce the amount of data being sent. In some instances, the ROBO site may decide not to down sample the data and instead send raw data (e.g., when anomalies in data are detected). The ROBO sites may be configured to continuously learn from past data transmissions and automatically update the data that is sent.

Thus, the present disclosure improves the operation of both the ROBO sites and the datacenter at the application layer. For example, by automatically determining and fine tuning based on historical information which data to send, the manner in which to send data (e.g., down sampled or raw), and when to send data, the ROBO sites can effectively and successfully transmit data to the datacenter without having to try multiple times. The resources that would otherwise have been used in transmitting data may now be applied towards other areas. Similarly, since the datacenter receives reduced amount of data and data that is more relevant, the datacenter resources spent in storing and analyzing the data is reduced, which may now be applied to other pressing needs. Thus, the present disclosure provides improvements in computer related technology.

Referring to FIG. 1, an example block diagram of a virtual computing system 100 is shown, in accordance with some embodiments of the present disclosure. The virtual computing system 100 includes a datacenter 105 that is communication with Remote Office Branch Office ("ROBO") sites 110, 115, and 120 via network links 125, 130, and 135, respectively. Although the datacenter 105 is shown in communication with three ROBO sites (e.g., the ROBO sites 110, 115, and 120), in some embodiments, the datacenter may be in communication with greater than or fewer than three ROBO sites.

The datacenter 105 may be a private or an enterprise datacenter that is associated with a particular company or organization to house that company or organization's computer systems, servers, storage and network components, power supplies, backup devices, and other equipment to store, manage, process, and backup data or otherwise perform the computing operations of that company or organization. In other embodiments, instead of being an enterprise datacenter, the datacenter 105 may be a general, internet facing, or public datacenter. The datacenter 105 is also configured to run, manage, and otherwise control each of the ROBO sites 110, 115, and 120. To run, manage, and otherwise control the ROBO sites 110, 115, and 120, the datacenter 105 is configured to push (e.g., send) information (e.g., data, instructions, etc.) to those ROBO sites and receive information (e.g., data, instructions, etc.) from each of those ROBO sites.

Thus, the datacenter 105 includes a central management system 140 that is configured to both request and receive information from each of the ROBO sites 110, 115, and 120. The central management system 140 may be configured as a virtual computing entity having one or more clusters, with each cluster having one or more nodes. In some embodiments, the central management system 140 may be installed on one or more virtual machines of one or more nodes. The central management system 140 includes a management user interface 145 via which the central management system may send requests to the ROBO sites 110, 115, and 120, as well as display and analyze the information received from those ROBO sites. The management user interface 145 is also associated with a processing unit 150, which is configured to execute instructions received via the management user interface and a memory 155 for storing at least the information received from the ROBO sites 110, 115, and 120. Although the central management system 140 is shown to have the management user interface 145, the processing unit 150, and the memory 155 only, in other embodiments, the central management system may include additional components that may be needed or considered desirable to perform the functions described herein.

The management user interface 145, thus, serves as a front-end system of the central management system 140 that is visible to a user. The management user interface 145 enables the user to request operations to be performed by the processing unit 150. The processing unit 150 is invisible to the user, and thus, forms a back-end system of the central management system 140. The processing unit 150 is configured to perform the operations requested by the user via the management user interface 145. To perform the user requested operations, the processing unit 150 may retrieve a set of instructions from a memory for execution. For example, in some embodiments, the processing unit 150 may retrieve the instructions from a non-volatile memory device and copy the instructions in an executable form to a volatile memory device that is generally some form of random access memory (RAM). The non-volatile and volatile memory devices may both be part of the memory 155 and/or provisioned separately from that memory. In other embodiments, the processing unit 150 may be configured to execute the operations within the non-volatile memory device itself without first copying the instructions to the volatile memory device. The processing unit 150 may be a special purpose computer, and may include logic circuits, hardware circuits, etc. to carry out those instructions. The processing unit 150 may be implemented in hardware, firmware, software, or any combination thereof and may include a single stand-alone processing unit, or a plurality of processing units that use the same or different processing technology. The instructions may be written using one or more programming language, scripting language, assembly language, etc. "Executing an instruction" means that the processing unit 150 performs the operations called for by that instruction.

The management user interface 145 provides a user interface (e.g., graphical user interface) that facilitates interaction between the users and the central management system 140, and between the central management system and the ROBO sites 110, 115, and 120. The management user interface 145 may present a variety of graphical icons, visual indicators, windows, menus, visual widgets, and other indicia to facilitate user interaction. In other embodiments, the management user interface 145 may be configured as other types of user interfaces, including for example, text-based user interfaces and other types of user interfaces. Thus, the management user interface 145 may be configured in a variety of ways.

Further, the management user interface 145 may be configured to receive external inputs in a variety of ways. For example, the management user interface 145 may be configured to receive external inputs using input technologies such as a keyboard, a stylus and/or touch screen, a mouse, a track ball, a keypad, a microphone, voice recognition, motion recognition, remote controllers, input ports, one or more buttons, dials, joysticks, etc. that are associated with the central management system 140 and allow an external source, such as the user, to enter information into the central management system. The management user interface 145 may also receive inputs from the ROBO sites 110, 115, and 120 via a network on the network links 125, 130, and 135. The management user interface 145 may also be configured to present outputs/information to the users and the ROBO sites 110, 115, and 120 in a variety of ways. For example, the management user interface 145 may be configured to present information to external systems such as users, memory, printers, speakers, displays, etc. that are associated with the central management system 140 and/or the ROBO sites 110, 115, and 120.

Therefore, although not shown, the central management system 140, and particularly the management user interface 145, may be associated with a variety of hardware, software, firmware components, or combinations thereof. Generally speaking, the central management system 140 may be associated with any type of hardware, software, and/or firmware component that enables the central management system to perform the functions described herein and further enables a user to manage and operate the ROBO sites 110, 115, and 120.

Further, in some embodiments, the management user interface 145 may be installed on a device associated with the central management system 140. In other embodiments, instead of or in addition to being installed on a particular device, the central management system 140 may be hosted on a cloud service and the management user interface 145 may be accessed via the cloud. In some embodiments, the central management system 140 may additionally or alternatively be configured as a mobile application that is suitable for installing on and access from a mobile computing device (e.g., a mobile phone), and the management user interface 145 may be accessed on a display of the mobile phone. Thus, the central management system 140 may be installed in a variety of ways and the management user interface 145 may be configured for access in a variety of ways.

In some embodiments, the central management system 140 may be accessed via an Application Programming Interface (API). For example, users may access the API associated with the central management system 140 via designated devices such as laptops, desktops, tablets, mobile devices, other handheld or portable devices, and/or other types of computing devices that are configured to access the API. These devices may be different from the device on which the central management system 140 is installed.

In some embodiments and when the central management system 140 is configured for use via the API, the users may access the central management system via a web browser and upon entering a uniform resource locator ("URL") for the API. In some embodiments, the API may be a representational state transfer ("REST") type of API. In other embodiments, the API may be any other type of web or other type of API (e.g., ASP.NET) built using any of a variety of technologies, such as Java, .Net, etc., that is capable of accessing the central management system 140 and facilitating communication between the users and the central management system.

In some embodiments, the API may be configured to facilitate communication between the users and the central management system 140 via a hypertext transfer protocol ("HTTP") or hypertext transfer protocol secure ("HTTPS") type request. The API may receive an HTTP/HTTPS request and send an HTTP/HTTPS response back. In other embodiments, the API may be configured to facilitate communication between the users and the central management system 140 using other or additional types of communication protocols, and by ways other than an API.

Additionally, although the central management system 140 is shown as being associated with each of the ROBO sites 110, 115, and 120, in some embodiments, an instance of the central management system may be provided for each ROBO site within the virtual computing system. Thus, in some embodiments, the datacenter 105 may include multiple instances of the central management system 140, with each instance of the central management system being associated with one or more ROBO sites.

Further, although the datacenter 105 has been shown in FIG. 1 as having only the central management system 140, the datacenter may include additional elements. For example, the datacenter 105 may have other equipment, infrastructure, components, and/or features such as power sources and generators, security devices, surveillance/monitoring systems, network interfaces, heating, ventilation, and air conditioning (HVAC) systems, and any other element that may be needed or considered desirable to have to operate those datacenters and perform the functions described herein.

Referring still to FIG. 1, each of the ROBO sites 110, 115, and 120 is a virtual computing entity smaller than the datacenter 105. For example, when the datacenter 105 is an enterprise datacenter that is associated with a retailer having multiple locations across the country, each of the individual locations of the retailer may be a designated ROBO site (e.g., the ROBO sites 110-120) and the all of the ROBO sites may be controlled and managed by the datacenter 105. Thus, the ROBO sites 110-120 may be remote and geographically distant from each other and from the datacenter 105. Each of the ROBO sites includes a local management system to manage the operations of the underlying ROBO site and to facilitate communication with the central management system 140 at the datacenter 105. For example and as shown, the ROBO site 110 is associated with a local management system 160, the ROBO site 115 is associated with a local management system 165, and the ROBO site 120 is associated with a local management system 170.

Although not shown, the local management system 160-170 includes a processing unit and a memory to allow the local management system to perform their intended operations. The local management system 160-170 may also include a user interface (e.g., similar to the management user interface 145) to allow a user to control and manage the underlying ROBO site via the associated local management system. The local management system 160-170 is configured to collect a variety of data from the underlying nodes and transmit the collected data to the central management system 140. Similarly, the local management system 160-170 is configured to receive data and instructions from the central management system 140 and perform operations consistent with the instructions.

Thus, the local management system 160 may be associated with a plurality of nodes 175A-175Z, the local management system 165 may be associated with a plurality of nodes 180A-180X, and the local management system 170 may be associated with a plurality of nodes 185A-185Y. The plurality of nodes 175A-175Z, 180A-180X, and 185A-185Y may be part of one or more clusters, and the associated local management system 160, 165, and 170, respectively may be configured to control and manage each of the clusters in the underlying ROBO site. In some embodiments, multiple instances of the local management system 160-170 may be provided within each ROBO site, and each instance of the local management system may be configured to control and manage one or more clusters in the underlying ROBO site.

Thus, each of the ROBO sites 110-120 includes one or more clusters controlled and managed by one or more instances of the local management system (e.g., the local management system 160-170), with each cluster having one or more nodes (e.g., the plurality of nodes 175A-175Z, 180A-180X, and 185A-185Y). Additional details of a ROBO site are discussed with respect to FIG. 2 below.

The network links 125, 130, and 135 that connect the ROBO sites 110, 115, and 120, respectively, to the datacenter 105 may be any of a variety of suitable communication links. In some embodiments, one or more of the network links 125, 130, and 135 may be Wide Area Network ("WAN") communication circuits that are configured to establish connection between the ROBO sites 110-120 and the datacenter 105. For example, in some embodiments, one or more of the network links 125, 130, and 135 may be circuit-switched type WAN communication circuits that are configured to establish temporary network connections between the ROBO sites 110-120 and the datacenter 105 when a connection is desired to receive/send information. In other embodiments, one or more of the network links 125, 130, and 135 may be leased or packet-switched WAN communication circuits that establish a permanent connection between the ROBO sites 110-120 and the datacenter 105.

Instead of a WAN communication circuit, in some embodiments, one or more of the network links 125, 130, and 135 may be a satellite communication circuit that is configured to establish communication between the ROBO sites 110-120 located on Earth with the datacenter 105 located on a satellite or space station, or vice-versa. One or more of the network links 125, 130, and 135 may also be wired communication circuits, such as Ethernet, cables, optical wires, etc. or wireless communication circuits such as radio waves, microwaves, internet, etc. Thus, the network links 125, 130, and 135 may be any of a variety of wired and/or wireless communication channels that facilitate a communication between the ROBO sites 110-120 and the datacenter 105. Further, although not shown, the network links 125, 130, and 135 may be associated with components such as routers, switches, network adaptors and interfaces, and other elements that may be needed or considered desirable in facilitating communication between the ROBO sites 110-120 and the datacenter 105.

Figure 2:
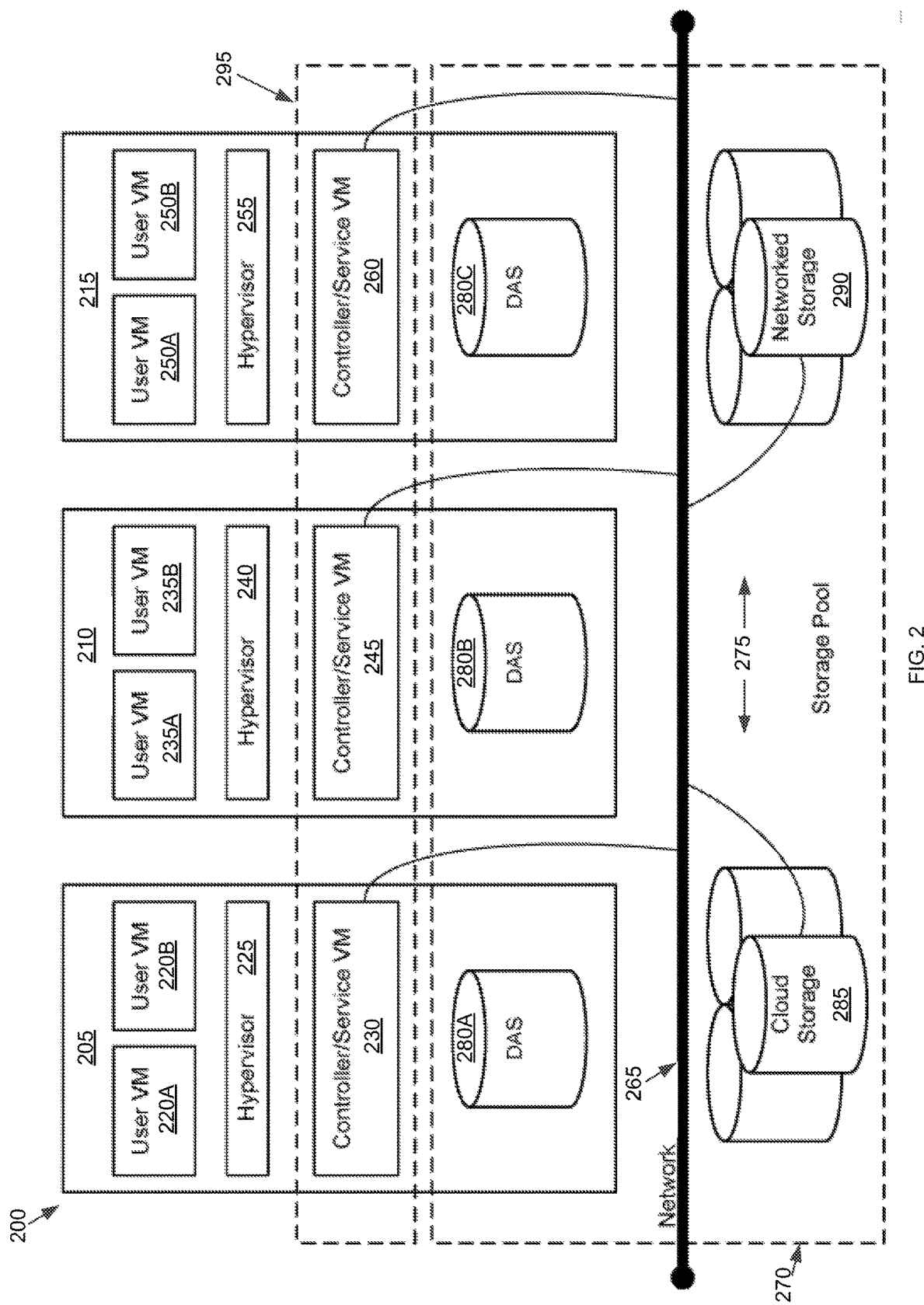
FIG. 2 is an example block diagram of a cluster within the virtual computing system of FIG. 1, in accordance with some embodiments of the present disclosure.

Turning to FIG. 2, a cluster 200 of a virtual computing system (e.g., the virtual computing system 100) is shown, in accordance with some embodiments of the present disclosure. The cluster 200 may form one or part of one ROBO site (e.g., the ROBO sites 110, 115, and 120). The cluster 200 may also be designated for use as a central management system (e.g., the central management system 140). The cluster 200 includes a plurality of nodes, such as a first node 205, a second node 210, and a third node 215. Each of the first node 205, the second node 210, and the third node 215 may also be referred to as a "host" or "host machine." The first node 205 includes user virtual machines ("user VMs") 120A and 120B (collectively referred to herein as "user VMs 220"), a hypervisor 225 configured to create and run the user VMs, and a controller/service VM 230 configured to manage, route, and otherwise handle workflow requests between the various nodes of the cluster 200. Similarly, the second node 210 includes user VMs 235A and 235B (collectively referred to herein as "user VMs 235"), a hypervisor 240, and a controller/service VM 245, and the third node 215 includes user VMs 250A and 250B (collectively referred to herein as "user VMs 250"), a hypervisor 255, and a controller/service VM 260. The controller/service VM 230, the controller/service VM 245, and the controller/service VM 260 are all connected to a network 265 to facilitate communication between the first node 205, the second node 210, and the third node 215. Although not shown, in some embodiments, the hypervisor 225, the hypervisor 240, and the hypervisor 255 may also be connected to the network 265. Further, although not shown, one or more of the first node 205, the second node 210, and the third node 215 may include one or more containers managed by a monitor (e.g., container engine).

The cluster 200 also includes and/or is associated with a storage pool 270 (also referred to herein as storage subsystem). The storage pool 270 may include network-attached storage 275 and direct-attached storage 280A, 280B, and 180C. The network-attached storage 275 is accessible via the network 265 and, in some embodiments, may include cloud storage 285, as well as a networked storage 290. In contrast to the network-attached storage 275, which is accessible via the network 265, the direct-attached storage 280A, 280B, and 180C includes storage components that are provided internally within each of the first node 205, the second node 210, and the third node 215, respectively, such that each of the first, second, and third nodes may access its respective direct-attached storage without having to access the network 265.

It is to be understood that only certain components of the cluster 200 are shown in FIG. 1. Nevertheless, several other components that are needed or desired in the cluster 200 to perform the functions described herein are contemplated and considered within the scope of the present disclosure.

Although three of the plurality of nodes (e.g., the first node 205, the second node 210, and the third node 215) are shown in the cluster 200, in other embodiments, greater than or fewer than three nodes may be provided within the cluster. Likewise, although only two user VMs (e.g., the user VMs 220, the user VMs 235, and the user VMs 250) are shown on each of the first node 205, the second node 210, and the third node 215, in other embodiments, the number of the user VMs on each of the first, second, and third nodes may vary to include either a single user VM or more than two user VMs. Further, the first node 205, the second node 210, and the third node 215 need not always have the same number of the user VMs (e.g., the user VMs 220, the user VMs 235, and the user VMs 250).

In some embodiments, each of the first node 205, the second node 210, and the third node 215 may be a hardware device, such as a server. For example, in some embodiments, one or more of the first node 205, the second node 210, and the third node 215 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 205, the second node 210, or the third node 215 may be another type of hardware device, such as a personal computer, an input/output or peripheral unit such as a printer, or any type of device that is suitable for use as a node within the cluster 200. Further, one or more of the first node 205, the second node 210, and the third node 215 may be organized in a variety of network topologies. Each of the first node 205, the second node 210, and the third node 215 may also be configured to communicate and share resources with each other via the network 265. For example, in some embodiments, the first node 205, the second node 210, and the third node 215 may communicate and share resources with each other via the controller/service VM 230, the controller/service VM 245, and the controller/service VM 260, and/or the hypervisor 225, the hypervisor 240, and the hypervisor 255.

Also, although not shown, one or more of the first node 205, the second node 210, and the third node 215 may include one or more processing units configured to execute instructions. The instructions may be carried out by a special purpose computer, logic circuits, or hardware circuits of the first node 205, the second node 210, and the third node 215. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 270, as well as with other elements of the first node 205, the second node 210, and the third node 215 to receive, send, and process information, and to control the operations of the underlying first, second, or third node. The processing units may retrieve a set of instructions from the storage pool 270, such as, from a non-volatile memory device and copy the instructions in an executable form to a volatile memory device that is generally some form of Random Access Memory ("RAM"). The non-volatile and volatile memory devices may both be part of the storage pool 270, or in some embodiments, may be separately provisioned from the storage pool. In other embodiments, the processing units may be configured to execute the operations within the non-volatile memory device itself without first copying the instructions to the volatile memory device. Further, the processing units may include a single stand-alone processing unit, or a plurality of processing units that use the same or different processing technology.

With respect to the storage pool 270 and particularly with respect to the direct-attached storage 280A, 280B, and 180C, each of the direct-attached storage may include a variety of types of memory devices. For example, in some embodiments, one or more of the direct-attached storage 280A, 280B, and 180C may include, but is not limited to, any type of RAM, Read Only Memory ("ROM"), flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 275 may include any of a variety of network accessible storage (e.g., the cloud storage 285, the networked storage 290, etc.) that is suitable for use within the cluster 200 and accessible via the network 265. The storage pool 270, including the network-attached storage 275 and the direct-attached storage 280A, 280B, and 180C, together form a distributed storage system configured to be accessed by each of the first node 205, the second node 210, and the third node 215 via the network 265, the controller/service VM 230, the controller/service VM 245, the controller/service VM 260, and/or the hypervisor 225, the hypervisor 240, and the hypervisor 255. In some embodiments, the various storage components in the storage pool 270 may be configured as virtual disks for access by the user VMs 220, the user VMs 235, and the user VMs 250.

Each of the user VMs 220, the user VMs 235, and the user VMs 250 is a software-based implementation of a computing machine. The user VMs 220, the user VMs 235, and the user VMs 250 emulate the functionality of a physical computer. Specifically, the hardware resources, such as processing unit, memory, storage, etc., of the underlying computer (e.g., the first node 205, the second node 210, and the third node 215) are virtualized or transformed by the respective hypervisor 225, the hypervisor 240, and the hypervisor 255, into the underlying support for each of the user VMs 220, the user VMs 235, and the user VMs 250 that may run its own operating system and applications on the underlying physical resources just like a real computer. By encapsulating an entire machine, including CPU, memory, operating system, storage devices, and network devices, the user VMs 220, the user VMs 235, and the user VMs 250 are compatible with most standard operating systems (e.g. Windows, Linux, etc.), applications, and device drivers. Thus, each of the hypervisor 225, the hypervisor 240, and the hypervisor 255 is a virtual machine monitor that allows a single physical server computer (e.g., the first node 205, the second node 210, third node 215) to run multiple instances of the user VMs 220, the user VMs 235, and the user VMs 250, with each user VM sharing the resources of that one physical server computer, potentially across multiple environments. For example, each of the hypervisor 225, the hypervisor 240, and the hypervisor 255 may allocate memory and other resources to the underlying user VMs (e.g., the user VMs 220, the user VMs 235, and the user VMs 250) from the storage pool 270 to perform one or more functions.

By running the user VMs 220, the user VMs 235, and the user VMs 250 on each of the first node 205, the second node 210, and the third node 215, respectively, multiple workloads and multiple operating systems may be run on a single piece of underlying hardware computer (e.g., the first node, the second node, and the third node) to increase resource utilization and manage workflow. When new user VMs are created (e.g., installed) on the first node 205, the second node 210, and the third node 215, each of the new user VMs may be configured to be associated with certain hardware resources, software resources, storage resources, and other resources within the cluster 200 to allow those virtual VMs to operate as intended.

The user VMs 220, the user VMs 235, the user VMs 250, and any newly created instances of the user VMs are controlled and managed by their respective instance of the controller/service VM 230, the controller/service VM 245, and the controller/service VM 260. The controller/service VM 230, the controller/service VM 245, and the controller/service VM 260 are configured to communicate with each other via the network 265 to form a distributed system 295. In some embodiments, each of the controller/service VM 230, the controller/service VM 245, and the controller/service VM 260 may form a management system configured to manage various tasks and operations within the underlying node. In other embodiments, each of the controller/service VM 230, the controller/service VM 245, and the controller/service VM 260 may be configured to provide information to and receive information from a local or central management system (e.g., the local management system 160-170, central management system 140), which may in turn be configured to facilitate communication between multiple clusters, as well as with components (e.g., the datacenter 105) outside of the cluster 100.

The hypervisor 225, the hypervisor 240, and the hypervisor 255 of the first node 205, the second node 210, and the third node 215, respectively, may be configured to run virtualization software, such as, ESXi from VMWare, AHV from Nutanix, Inc., XenServer from Citrix Systems, Inc., etc. The virtualization software on the hypervisor 225, the hypervisor 240, and the hypervisor 255 may be configured for running the user VMs 220, the user VMs 235, and the user VMs 250, respectively, and for managing the interactions between those user VMs and the underlying hardware of the first node 205, the second node 210, and the third node 215. Each of the controller/service VM 230, the controller/service VM 245, the controller/service VM 260, the hypervisor 225, the hypervisor 240, and the hypervisor 255 may be configured as suitable for use within the cluster 200.

The network 265 may include any of a variety of wired or wireless network channels that may be suitable for use within the cluster 200. For example, in some embodiments, the network 265 may include wired connections, such as an Ethernet connection, one or more twisted pair wires, coaxial cables, fiber optic cables, etc. In other embodiments, the network 265 may include wireless connections, such as microwaves, infrared waves, radio waves, spread spectrum technologies, satellites, etc. The network 265 may also be configured to communicate with another device using cellular networks, local area networks, wide area networks, the Internet, etc. In some embodiments, the network 265 may include a combination of wired and wireless communications.

Referring still to FIG. 2, in some embodiments, one of the first node 205, the second node 210, or the third node 215 may be configured as a leader node. The leader node may be configured to monitor and handle requests from other nodes in the cluster 200. For example, a particular user VM (e.g., the user VMs 220, the user VMs 235, or the user VMs 250) may direct an input/output request to the controller/service VM (e.g., the controller/service VM 230, the controller/service VM 245, or the controller/service VM 260, respectively) on the underlying node (e.g., the first node 205, the second node 210, or the third node 215, respectively). Upon receiving the input/output request, that controller/service VM may direct the input/output request to the controller/service VM (e.g., one of the controller/service VM 230, the controller/service VM 245, or the controller/service VM 260) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 200 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the cluster 200. If the leader node fails, another leader node may be designated.

Again, it is to be understood again that only certain components and features of the cluster 200 are shown and described herein. Nevertheless, other components and features that may be needed or desired to perform the functions described herein are contemplated and considered within the scope of the present disclosure. It is also to be understood that the configuration of the various components of the cluster 200 described above is only an example and is not intended to be limiting in any way. Rather, the configuration of those components may vary to perform the functions described herein.

Figure 3:
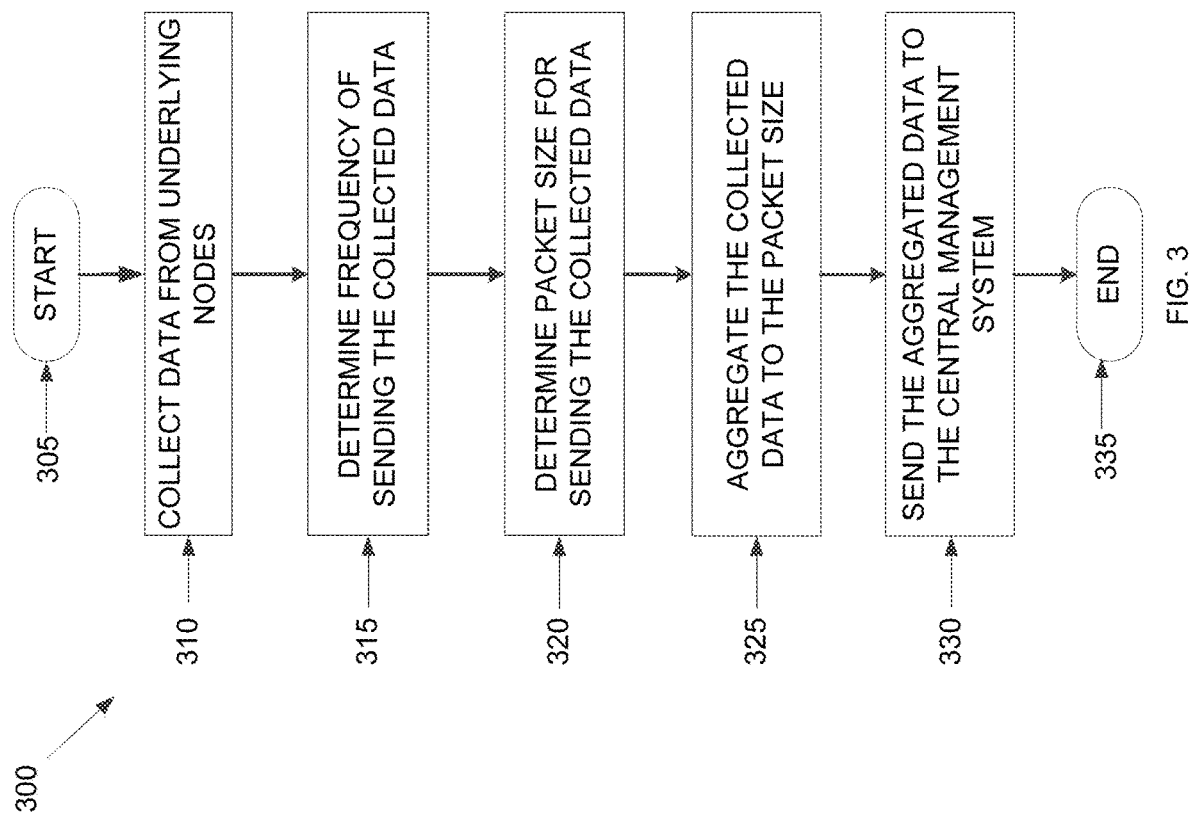
FIG. 3 is an example flowchart outlining operations for collecting data from a remote office branch office site of the virtual computing system of FIG. 1 for sending to a central management system of the virtual computing system, in accordance with some embodiments of the present disclosure.

Referring to FIG. 3, an example flow chart outlining operations of a process 300 is shown, in accordance with some embodiments of the present disclosure. The process 300 may include additional, fewer, or different operations, depending on the particular embodiment. The process 300 is discussed in conjunction with FIGS. 1 and 2, and is implemented by the local management system (e.g., the local management system 160-170) of a ROBO site (e.g., the ROBO sites 110-120). For simplicity of explanation, the process 300 is explained with respect to the local management system 160 of the ROBO site 110 having the nodes 175A-175Z. However, the process 300 also applies to the local management systems 165 and 170 of the ROBO sites 115 and 120, respectively.

The process 300 starts at operation 305 when it is time to collect data from the nodes 175A-175Z. In some embodiments, the local management system 160 may determine that it is time to collect data from the nodes 175A-175Z, while in other embodiments the controller/service virtual machine of those nodes may determine that it is time to collect data. In some embodiments, data may be collected every thirty seconds. In other embodiments, data may be collected at granularities of less than or greater than thirty seconds, including in other units of time (e.g., minutes, hours, days, weeks, months, etc.) based on a schedule. In some embodiments, the local management system 160 may receive the schedule from the central management system 140. In other embodiments, the local management system 160 may receive the schedule directly from a user via a user interface of the local management system.

Upon receiving the schedule, if the controller/service virtual machine of the nodes 175A-175Z is designated with collecting the data, the local management system 160 may program the schedule within the controller/service virtual machine. In some embodiments, the local management system 160 may program the schedule within the leader controller/service virtual machine of the nodes 175A-175Z, and the leader controller/service virtual machine may then transfer the schedule to the controller/service virtual machines of the remaining nodes. In other embodiments, the local management system 160 may program each of the controller/service virtual machine of the nodes 175A-175Z. Further, in some embodiments, the same schedule may apply to all of the nodes 175A-175Z. In other embodiments, multiple schedules may be provided, with each schedule applying to one or more of the nodes 175A-175Z.

Based upon the schedule, data is collected from the nodes 175A-175Z at operation 310. In some embodiments, the local management system 160 may collect the data directly from each of the associated nodes 175A-175Z. In other embodiments, upon determining that it is time to collect data from the nodes 175A-175Z, the local management system 160 may send a request to the controller/service virtual machine of those nodes, and the controller/service virtual machines may collect the data from the nodes. In some embodiments, the request may specify the type of data to collect. In other embodiments, the type of data to collect may be pre-programmed within the controller/service virtual machine. In other embodiments, the controller/service virtual machine of the nodes 175A-175Z may collect the data based on the schedule without waiting to receive a specific request from the local management system 160. To collect the data, in some embodiments the controller/service virtual machine may access a software service configured to keep a record of the data from the nodes 175A-175Z. In other embodiments, the controller/service virtual machine may access one or more logs, databases, counters, and other components to retrieve the data related to the nodes 175A-175Z.

The data that is collected from the nodes 175A-175Z may be any of a variety of data such as metric data (e.g., memory utilization, CPU utilization, latency, etc.), alert data (e.g., data indicative of a problem within the node), and/or any other analytical or statistical data that may be needed to considered desirable to analyze in managing and operating the ROBO site 110. The data may be collected from the virtual machines of the nodes 175A-175Z, the hypervisor of those nodes, and/or any other component of those nodes based on the type of data being collected.

Thus, in those embodiments in which the controller/service virtual machine is configured to collect the data, the controller/service virtual machine of each of the nodes 175A-175Z collects the data based on the schedule (e.g., every thirty seconds) and transmits the collected data to the local management system 160. In some embodiments, each controller/service virtual machine may directly transmit the collected data to the local management system 160, while in other embodiments, the controller/service virtual machine of the leader node may collect the data from all other controller/service virtual machines, and the leader controller/service virtual machine may transmit all of the collected data to the local management system 160. Upon receiving the data collected from the nodes 175A-175Z, the local management system 160 may store the data within a memory associated therewith. In some embodiments, the local management system 160 may be configured to store the data for a pre-determined period of time (e.g., ninety days). Upon expiration of the pre-determined period of time, the local management system 160 may delete the data that was collected before the pre-determined period of time.

The local management system 160 is also configured to transmit the collected data to the central management system 140. Before each transmission of data, the local management system 160 performs a variety of optimizations to efficiently and quickly transmit the relevant data to the central management system 140. For example, the local management system 160 determines the frequency with which to transmit the data to the central management system 140. In other words, the local management system 160 determines how often to transmit the data to the central management system 140. While the data is collected at a certain granularity (e.g., every thirty seconds), the data may be transmitted to the central management system at a different granularity (e.g., greater than thirty seconds) based on the frequency determined by the local management system 160. Instead of transmitting the collected data instantaneously or at fixed intervals, the local management system 160 is configured to identify the best times to transmit data successfully in a single or minimum number of attempts to the central management system 140. Thus, the local management system 160 determines the frequency at operation 315. The local management system 160 also determines how much data to send in each transmission. Thus, the local management system 160 computes a packet size of data that can be sent during a given transmission at operation 320.

The frequency of transmitting data, as well as the packet size of the data for the transmission from the local management system 160 to the central management system 140, is based upon the characteristics of the network link 125 that connects the local management system to the central management system. Generally speaking, the network link 125 has three main characteristics: bandwidth, latency, and type of connection. Bandwidth of the network link 125 may be defined as a rate of data transfer (e.g., amount of data transferred within a specific amount of time) between the local management system 160 and the central management system 140. Bandwidth may be measured in bits per second or other like units. The bandwidth of the network link 125 may be known to the local management system 160 and/or the local management system 160 may be associated with tools (e.g., netperf, ttcp, etc.) that are configured to determine the bandwidth of the network link for the local management system. The bandwidth may be a static parameter, in that the bandwidth of the network link 125 is unlikely to change from one transmission of data to the next.

Latency of the network link 125 is the total amount of time that a transmission takes from the time the data is sent from the local management system 160 to the time that an acknowledgment (acknowledging receipt of the data) is received from the central management system 140. Latency is dependent upon bandwidth. For lower bandwidths, the latency may be higher (e.g., takes longer for the transmission).

The type of connection of the network link 125 may indicate the reliability of the network connection. The connection may be "up" or "down." When the connection is up, it means that the network link 125 is capable of establishing communication and sending information between the local management system 160 and the central management system 140. When the connection is down, it means that the network link 125 is incapable of establishing communication and sending information between the local management system 160 and the central management system 140. For an up connection, the type of connection may be either good or flaky. For example, if all (or most) of the data that is transmitted from the local management system 160 reaches the central management system 140, and an acknowledgement is received back from the central management system, the type of connection is considered a "good" connection. On the other hand, if data packets greater than a threshold number are lost during transmission, the connection is considered a "flaky" connection. The local management system 160 may determine that data packets are lost based upon receiving an error message that the data transmission failed or not receiving an acknowledgement from the central management system 140 within a designated time period. In some embodiments, the local management system 160 may be associated with tools that determine the type of connection (e.g., up/down, good/flaky).

Thus, based on the bandwidth, latency, and type of connection, the local management system 160 determines the frequency of transmitting data from the local management system to the central management system 140, as well as the data packet size to be transmitted during each transmission. Specifically, the local management system 160 may only send data when the connection is up. Thus, to determine the frequency of transmitting data, the local management system 160 may determine when the connection was previously up within a designated period of time. For example, the local management system 160 may look at the last twenty four hours to determine when the connection was up in those twenty four hours. Based on the past data, the local management system 160 may predict when the connection is expected to be up in the future twenty four hours. For example, if the local management system 160 determines that the connection was up at 10:00 AM and 2:00 PM in the past twenty four hours, the local management system may expect the connection to be up again at 10:00 AM and 2:00 PM in the next twenty four hours. Thus, the local management system 160 may determine that the frequency of transmitting data from the local management system to the central management system 140 is twice (e.g., at 10:00 AM and 2:00 PM) in every twenty four hours.

In some embodiments, upon determining when the connection was up in the past, the local management system 160 may also determine whether the connection was good or flaky in each of the instances that the connection was up. In some embodiments, if a transmission of data was attempted during those past times when the connection was up, the local management system 160 may determine whether the connection was good or flaky based upon whether the transmission was successful or not. For example, if the connection was up four times in the past designated period of time (e.g., twenty four hours) and a transmission was attempted in each of those four times, but only three of those four times, acknowledgement receipts were received, the local management system 160 may determine that the connection was good three of those four times and base the frequency of transmission on the good connection. In other embodiments, the local management system 160 may be configured to identify a good connection by other mechanisms. In some embodiments, the local management 160 may be programmed with a default frequency. If the local management system 160 determines that the connection is continuously up (and good), the local management system may use the default frequency to transmit data from the local management system to the central management system 140.

Furthermore, in some cases, the local management system 160 may be configured to transmit data based upon a cost of transmission associated with the network link 125 and/or a time frame provided by the central management system 140. As discussed above, customers generally pay for using the network link 125. The cost of using the network link 125 may be more during certain times than another. For example, using the network link 125 to transmit data at night may be cheaper than using the network link during the day. Weekends may be cheaper than weekdays. The local management system 160 may be programmed to transmit data when the network link 125 is cheaper to use. For example, the local management system 160 may be configured to transmit data when the cost of the network link 125 is below a certain threshold amount. Thus, when the local management system 160 analyzes past transmissions to identify the frequency of transmission based upon connection being up/good, the local management system may look at periods of time during which the cost of using the network link 125 is below the threshold amount. For example, if the local management system 160 is programmed to transmit data at night (e.g., between 10:00 PM and 5:00 AM), the local management system may determine when at night between 10:00 PM and 5:00 AM is the connection up/good.

In some embodiments, the local management system 160 may be configured to transmit data when the network link 125 is less likely to be used for other critical operations. In other words, the local management system 160 may be configured to transmit when the network link 125 is not busy. For example, the datacenter 105 may send pricing information, marketing information, etc. to the ROBO site during the hours of 5 AM to 7 PM. Thus, the local management system 160 may be configured to transmit the collected data outside of those hours such that the transmission of pricing and marketing information is not hampered.

In other embodiments, the central management system 140 may provide the local management system 160 a time frame to transmit data. Since the central management system 140 receives data from multiple ROBO sites, to efficiently manage all of the received data, in some embodiments, the central management system may provide a designated time slot to each ROBO site to transmit the data. In some embodiments, the time slot that the central management system 140 provides to each ROBO site may be staggered (e.g., offset from the time slots of other ROBO sites), such that at any given time, the central management system receives data from a single ROBO site. Thus, if the local management system 160 has received a specific time slot from the central management system 140 to transmit the data, the local management system may determine when the connection was previously up/good in that time slot. Further, in some embodiments, the local management system 160 may receive a time slot from the central management system 140, as well as be programmed to transmit data when using the network link 125 is cheaper/not busy. In such cases, the local management system 160 may find a window of time that overlaps both the time slot from the central management system 140 and the time frame when the network link 125 is cheaper/not busy, and determine the frequency of transmitting within that overlapping time window. If there is no overlap, the local management system 160 may be configured to prioritize either the time slot of the central management system 140 or the time frame when the network link 125 is cheaper/not busy.

Thus, the local management system 160 is configured to balance a variety of factors to determine the frequency of transmitting data from the local management system to the central management system 140. In sum, the local management system 160 may identify one or more time windows within which to transmit data. The time window(s) may be based upon programmed defaults, a time frame provided by the central management system, a time frame when the using the network link 125 is cheaper, when the network link is not busy, and/or any other consideration. The local management system 160 may then analyze historical (e.g., past) connection related data of those time window(s) to determine time slots when the connection was up/good in each of those past time window(s). The frequency of transmission in the future may then be based on those time slots when the connection was up/good. Thus, the frequency may identify how many times within a given time period to transmit data to the central management system 140, as well as identify the start times of the transmissions.

Therefore, the frequency of transmission from the local management system 160 to the central management system 140 is a tunable parameter that is variable and continuously adapts based upon one or more factors and characteristics of the network link 125. Since the local management system 160 automatically determines the frequency and dynamically updates the frequency based upon one or more factors and the characteristics of the network link 125, the process of determining the frequency is referred to herein as frequency autosensing.

Additionally, at the operation 320, the local management system 160 determines how much data to send during each transmission. Thus, the local management system 160 determines a data packet size based upon the characteristics of the network link 125. Specifically, the data packet size is determined based upon the frequency. For the transmission start time identified in the frequency determination of the operation 315, the local management system 160 determines for how long in the past was the connection up/good. For example, if one of the frequencies determined at the operation 315 indicates a data transmission start time of 10:00 PM, the local management system 160 may determine for low long the connection was up/good during the last one or more 10:00 PM transmissions. In other words, the local management system 160 determines when the connection went down (or became too flaky to transmit reliably) after being up/good. The time period between when the connection was good/up and when the connection went down/flaky provides a maximum latency.

For example, if the local management system 160 determines that the connection that was good/up at 10:00 PM went down at 10:10 PM, the local management system may determine that the latency cannot exceed 10 minutes. In some embodiments, the maximum latency may be based upon a time period between a previous successful transmission and a previous failed transmission. The maximum latency defines how much data may be transmitted, such that the data is successfully transmitted from the local management system 160 to the central management system 140 and an acknowledgment from the central management system is received back at the local management system. If the local management system 160 determines the time period between the connection being up/good and down/flaky (or between successful and failed transmissions) for multiple past transmissions, the local management system may apply a mathematical function (e.g., average) to the various time periods to obtain the maximum latency.

Since the bandwidth of the network link 125 is known to the local management system 160, the local management system may compute the data packet size using the bandwidth and the maximum latency. In some embodiments, the data packet size is obtained by dividing the bandwidth by the maximum latency. Thus, based upon the characteristics of the network link 125, the data packet size may vary from one transmission to the next. Instead of sending data of fixed data packet sizes, by dynamically varying the data packet size based upon the characteristics of the network link 125, the present disclosure greatly increases the probability of successfully transmitting data to the central management system 140 in a single attempt. Based on the computed data packet size, at operation 325, the local management system 160 transmits data in one or more data chunks such that the total packet size of the one or more data chunks combined does not exceed the data packet size computed at the operation 320.

Additionally, in some embodiments, the data packet size may not be big enough to send all of the data collected since the last transmission. Thus, before transmission, the local management system 160 may identify which data to send and what, if any, data aggregation technique to apply to the data being sent. The aggregation of the data is described in greater detail in FIG. 4 below. Upon aggregating the data (e.g., identifying which data to send and how to combine the data being sent), the local management system 160 sends the aggregated data to the central management system at operation 330. The aggregated data is sent via the network link 125. The local management system 160 may wait to receive an acknowledgment back from the central management system 140 to confirm that the data was successfully transmitted. If the acknowledgement is received, the local management system 160 may designate the data as sent and remove the sent data from the collection of data that still needs to be sent to the central management system 140. If the local management system 160 receives an error message that the transmission of the operation 330 failed or if the local management system does not receive an acknowledgement back from the central management system 140 within the maximum latency period, the local management system may determine that the transmission failed and the data needs to be transmitted again. The local management system 160 may attempt to re-transmit the data from the failed transmission right away, during the next transmission based on the frequency computed at the operation 315, or in any other time frame programmed within the local management system. The process 300 ends at operation 335.

Figure 4:
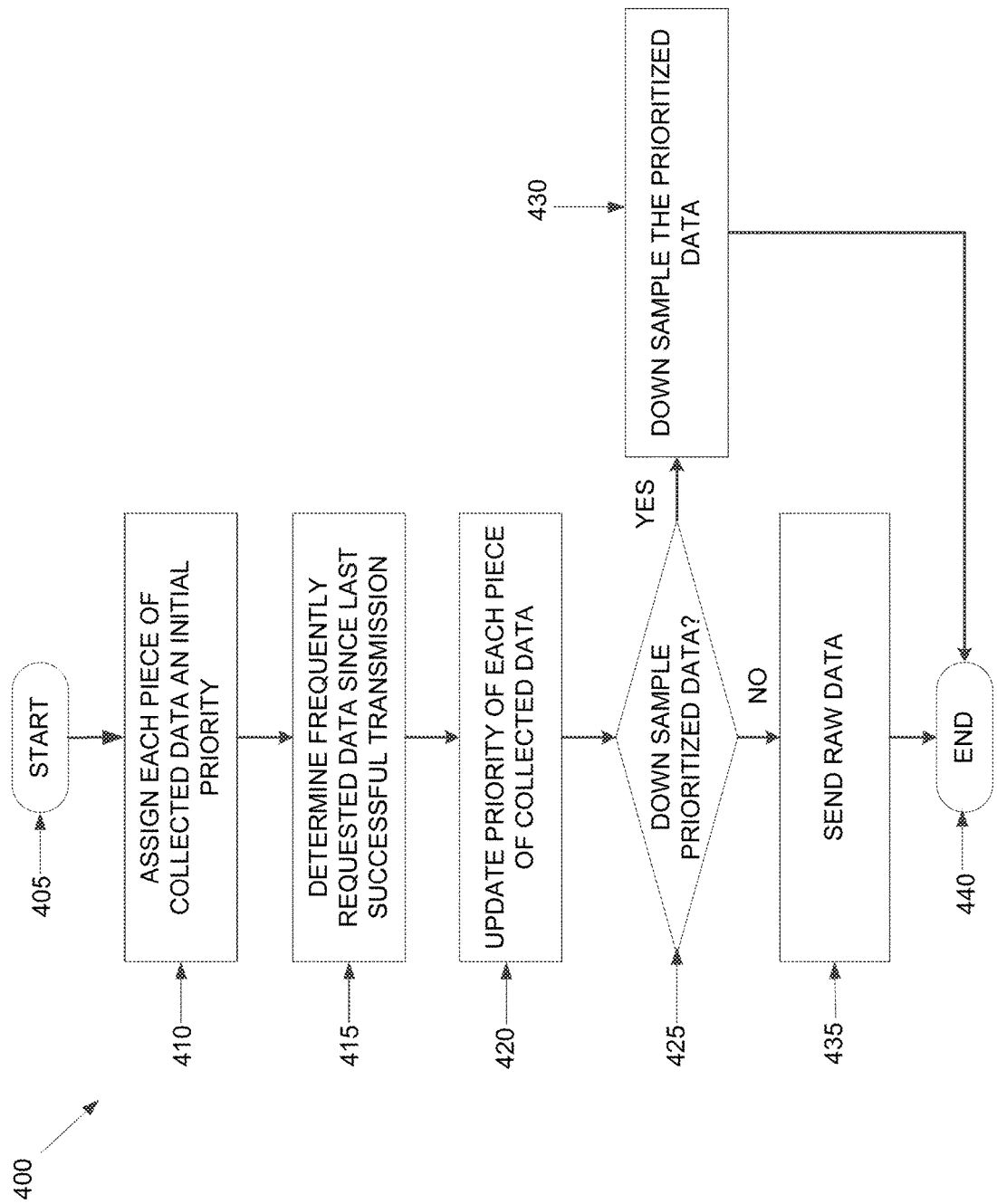
FIG. 4 is an example flowchart outlining operations for aggregating the data collected in FIG. 4, in accordance with some embodiments of the present disclosure.

Referring now to FIG. 4, an example flowchart outlining a process 400 is shown, in accordance with some embodiments of the present disclosure. The process 400 may include additional, fewer, or different operations, depending on the particular embodiment. The process 400 is discussed in conjunction with FIGS. 1-3, and is implemented by the local management system (e.g., the local management system 160-170) of a ROBO site (e.g., the ROBO sites 110-120). For simplicity of explanation, the process 400 is explained with respect to the local management system 160 of the ROBO site 110. However, the process 400 also applies to the local management systems 165 and 170 of the ROBO sites 115 and 120, respectively. The process 400 explains the operation 325 in greater detail.

The process 400 starts at operation 405 with the local management system 160 determining the frequency and the data packet size according to the operations 315 and 320, respectively. The local management system 160 also identifies which data to transmit. In some embodiments, the local management system 160 may sort each piece of data collected since the last successful transmission, as well as any data collected before the last successful transmission that still needs to be transmitted. As part of sorting, the local management system 160 may assign each piece of data a priority and transmit the higher priority data first. Thus, at operation 410, the local management system 160 assigns each piece of data that needs to be transmitted to the central management system 140 an initial priority (also referred to herein as initial rank).

The format of the initial priority may vary from one embodiment to another. In some embodiments, the format of the initial priority may be a number, letter, alphanumeric, special character, or any combination thereof. In other embodiments, other formats for the initial priority may be used. In some embodiments, the initial priority may be represented by a single bit or multiple bit flag appended to the data. In other embodiments, the initial priority may be stored within a look-up table to map each piece of data to their associated initial priority. In other embodiments, other mechanisms of associating the data with the initial priority may be used.

The initial priority may be based upon a variety of factors. One such factor is the type of data. Each piece of data that is transmitted to the central management system 140 may be a particular type of data. Example types of data may be alert type of data, metric type of data, etc. The local management system 160 is configured to identify the type of data for each piece of data that is collected from the nodes 175A-175Z. Further, the local management system 160 may be configured to prioritize certain types of data higher than other types of data. For example, in some embodiments, the local management system 160 may be configured to prioritize alert type of data higher than all other types of data. In such cases, the local management system 160 may assign a higher priority to each piece of data that is characterized as alert type of data over other types of data.

Another factor may be based upon anomalous behavior identified during operation of the nodes 175A-175Z. Specifically, in some embodiments, the local management system 160 may be configured to monitor the operation of the nodes 175A-175Z and assign priority to the data based on the monitoring. For example, the local management system 160 may be configured to identify (or receive indication of) anomalous behavior and prioritize data associated with the anomalous behavior higher than other data. The local management system 160 may identify anomalous behavior based on historical data or parameters that indicate anomalous behavior. For example, the local management system 160 may determine that the CPU utilization of a particular node is generally X % and then suddenly the CPU utilization spikes or increases to Y %. The sudden spike of the CPU utilization to Y % may not be severe enough to generate an alert. However, since the sudden spike is outside the typical CPU utilization of X %, the sudden spike may be indicative of a potential problem. Further, since the central management system 140 is likely to be interested in analyzing the sudden spike in the CPU utilization, the local management system 160 may designate the CPU utilization of Y % to be anomalous behavior. The local management system 160 may also prioritize the data associated with the anomalous behavior (e.g., CPU utilization of Y %) higher than the CPU utilization data of other nodes and/or higher than other types of data from the same or other nodes.

Yet another factor may be priorities assigned in a previous transmission. In some embodiments, the data that is transmitted from the local management system 160 to the central management system 140 may be converted into another form (e.g., down sampled and/or compressed) before transmission. Thus, in some embodiments, the central management system 140 does not receive raw data, but rather abridged data. If the central management system 140 detects an anomaly in the abridged data, the central management system may request the raw data corresponding to a portion of the abridged data. The local management system 160 may keep track of the raw data that the central management system 140 requests to identify frequently requested data.

For example, the local management system 160 may determine that the central management system 140 frequently requests data pertaining to a specific type of alert (e.g., latency related alerts). As another example, the local management system 160 may determine that the central management system 140 frequently requests CPU utilization data (alerts and/or anomalies). If the central management system 140 requests certain data more than a designated number of times within a designated time period, the local management system 160 may classify that data as being frequently requested. Determination of which data is more frequently requested by the central management system 140 is referred to herein as data autosensing. Upon determining that the central management 140 frequently requests certain data, the local management system 160 may prioritize that category of data in the collected data higher than data not previously requested by the central management system. The local management system 160 may also prioritize the previously requested data higher than other types of data and data corresponding to anomalous behavior.

Thus, the local management system 160 is configured to assign initial priorities to each piece of data that is collected based upon a type of data, any anomalous behavior detected, previously requested data by the central management system 140, and any other criteria programmed within the local management system. When the local management system 160 is initialized (e.g., installed), during the first few transmissions to the central management system 140, the initial priorities may be based more on the type of data and the anomalous behavior and less on the previously requested data by the central management system (e.g., because there may be no or few previously requested data). As the local management system 160 continues to transmit data to the central management system 140 and as the data requests by the central management system accumulate, the initial priorities may be based more on the previous data requests and less on the type of data and the anomalous behavior. Thus, the local management system 160 is configured to learn from past behavior and assign initial priorities based on data that the local management system determines to be more relevant to the central management system 140.

The local management system 160 is further configured to update the initial priorities at operation 415. The local management system 160 may determine at the operation 415 what, if any, data the central management system 140 requested since the previous successful transmission, and if that data is considered to be frequently requested. If the local management system 160 determines that the data requested by the central management system 140 since the last successful transmission is frequently requested, the local management system may update the initial priorities to reflect this new frequently requested data. For example, in some embodiments, the local management system 160 may determine that the data requested by the central management system 140 since the last successful transmission was already considered frequently requested, the local management system may increase the priority of that data even further. If the local management system 160 determines that the data requested by the central management system 140 since the last successful transmission is a new addition to the frequently requested list, the local management system may increase the priority of that data over the other types of data and the data corresponding to anomalous behavior.

Thus, the more frequently that a piece of data is requested by the central management system 140, the higher the priority of that piece of data is. At operation 420, the local management system 160 updates the initial priority of each piece of data to be transmitted to the central management system 140. If the local management system 160 determines at the operation 415 that no data was requested by the central management system 140 since the last transmission or that no data that was requested was determined to be frequently requested, the updated priority is the same as the initial priority. However, if new data is added to the frequently requested list or if the priority of an existing frequently requested data is increased, the local management system 160 updates the initial priority of each piece of data to an updated priority at the operation 420.

The updated priority is such that the data most frequently requested by the central management system 140 is at the top of the priority list, followed by data less frequently requested by the central management system, other types of data, and data corresponding to anomalous behavior. The updated priority during this transmission becomes the initial priority in the next transmission. Thus, the local management system 160 is configured to continuously refine the initial priority assigned to each piece of collected data such that data that is considered most relevant to the central management system 140 (e.g., the highest priority data) is transmitted first. Thus, by assigning priorities and refining those priorities, the local management system 160 determines which data to transmit first to the central management system 140.

Additionally, at operation 425, the local management system 160 determines whether to convert data into another form before transmission. In some embodiments, the local management system 160 may be pre-programmed to down sample certain data, and not to down sample other data. In other embodiments, the local management system 160 may learn from past transmissions which data to down sample. For example, the local management system 160 may be configured not to down sample data that the central management system 140 frequently requests and send that data raw (e.g., without conversion into another form). In some embodiments, the local management system 160 may be configured to transmit all frequently requested data in a raw form, while in other embodiments the local management system may be configured to send only the most frequently requested data in a raw form. The local management system 160 may be configured to distinguish between most frequently and less frequently requested data based upon a number of times (e.g., greater than a threshold) that the data was requested in a past predetermined period of time.

Thus, the transmission of data from the local management system 160 to the central management system 140 may include all down sampled data, all raw data, or a combination of down sampled data and raw data. For example, when the local management system 160 is newly initialized and the priorities of more of the collected data are based on the types of data and data corresponding to anomalous behavior, the transmission may include more down sampled data and less raw data. As the local management system 160 learns the data requesting patterns of the central management system 140 and the data being transmitted includes more frequently requested data, the transmitted data may gradually shift to including more raw data. In some embodiments, the local management system 140 may be configured to transmit the data associated with detected anomalies in raw form. Thus, the local management system 160 continuously adapts which data to send to the central management system 140 and the manner (e.g., down sampled or raw) of sending that data based upon the needs of the central management system.

For data that is to be down sampled, at operation 430, the local management system 160 down samples the data. Down sampling data means that multiple pieces of raw data are collated into a single piece of data. For example, in some embodiments, down sampling may include computing an average of the data being down sampled. In other embodiments, down sampling may include computing a median, mode, maximum, minimum, or other function of the data being down sampled. In some embodiments, the local management system 160 may also compress and/or encrypt the data before transmission. If all of the data being sent is down sampled data, the local management system 160 may create a data packet from the down sampled data, which may be optionally compressed and/or encrypted. The highest priority data is prepared for transmission first. The local management system 160 is configured to create the data packets such that the size of the data packet is no greater than the data packet size computed at the operation 325 of FIG. 3. The data packet constitutes the aggregated data that the local management system 160 transmits to the central management system 140 at the operation 330.

For data that is to be transmitted raw, at operation 435, the local management system 160 combines the highest priority raw data into a data packet. The data packet may optionally be compressed and/or encrypted such that the size of the data packet does not exceed the data packet size computed at the operation 325. The data packet constitutes the aggregated data that the local management system 160 transmits to the central management system 140 at the operation 330.

In embodiments in which the transmitted data includes a portion of down sampled data and a portion of raw data, the local management system 160 may attempt to first send the raw data. For example, in some cases, the local management system 160 may transmit the raw data as discussed above in the operation 435 and wait for acknowledgment back from the central management system 140. If the data packet size of the raw data that is transmitted is less than the data packet size computed at the operation 325, the local management system 160 may have time to send another data packet before the connection of the network link 125 goes down. The local management system 160 may subtract the data packet size computed at the operation 325 from the data packet size of the raw data to obtain a modified data packet size for sending the down sampled data. The local management system 160 may prepare a data packet of the modified data packet size in accordance with the operation 430 and send the down sampled data upon receiving an acknowledgement back that the raw data packet was successfully transmitted.

In other embodiments, the local management system 160 may prepare a single data packet including both raw data and down sampled data that is transmitted to the central management system 140. To prepare the single data packet, the local management system 160 may first collect all of the raw data that is to be transmitted and prepare the raw data packet in accordance with the operation 435. If the size of the raw data packet is less than the data packet size computed at the operation 325, the local management system may down sample a portion of data designated for down sampling in accordance with the operation 430, and combine the down sampled data packet with the raw data packet, which may be optionally compressed and/or encrypted such that the total size of the final data packet is less than the data packet size of the operation 325.

Upon transmitting the data, the process 400 ends at operation 440.

Figure 5:
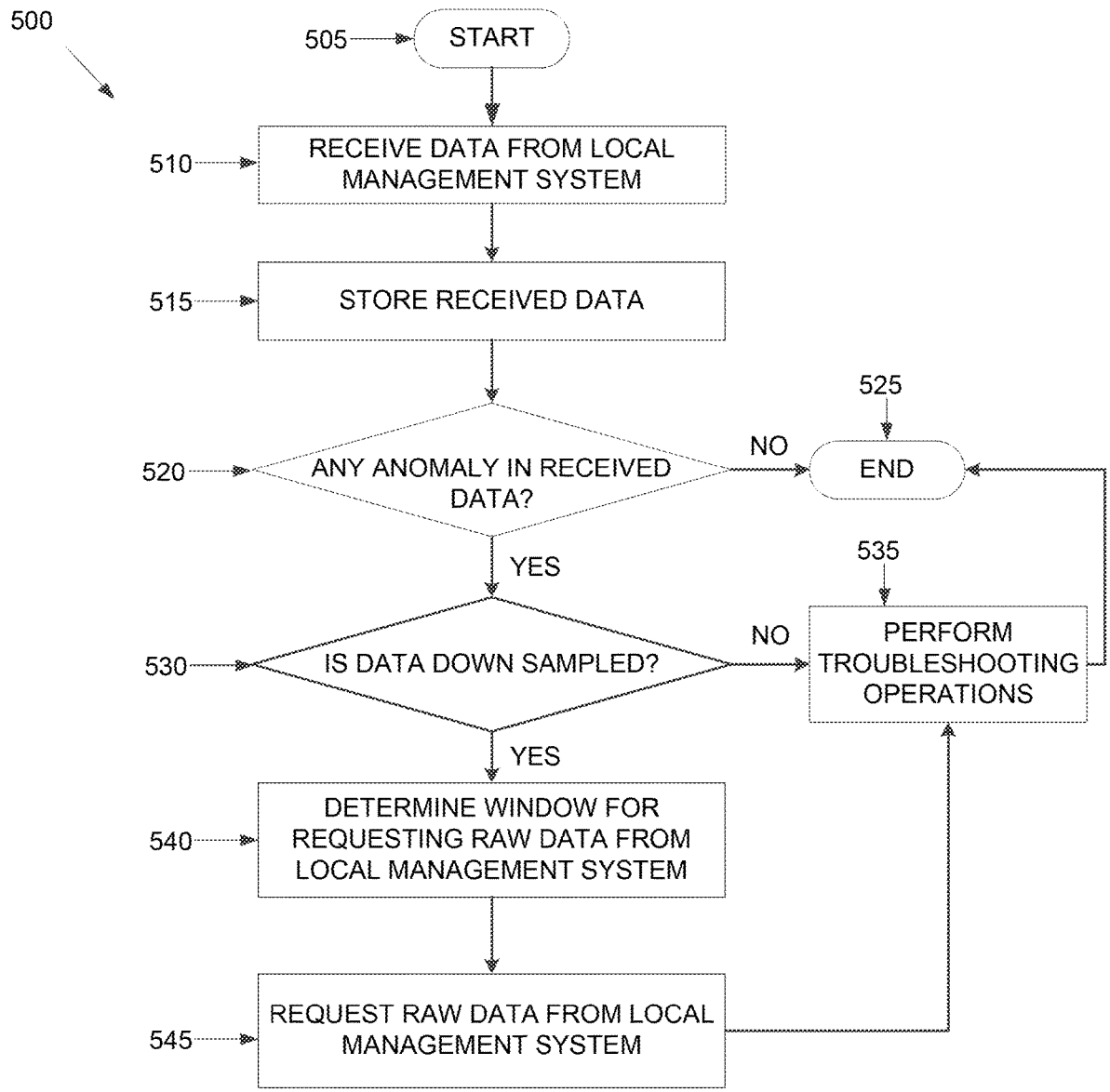
FIG. 5 is an example flowchart outlining operations for analyzing the data received from FIG. 4 and requesting additional data based on the analysis, in accordance with some embodiments of the present disclosure.

Turning now to FIG. 5, an example flowchart outlining a process 500 is shown, in accordance with some embodiments of the present disclosure. The process 500 may include additional, fewer, or different operations, depending on the particular embodiment. The process 500 is discussed in conjunction with FIGS. 1-4, and is implemented by the central management system 140. For simplicity of explanation, the process 500 is explained with respect to the local management system 160 of the ROBO site 110. However, the process 300 also applies to the local management systems 165 and 170 of the ROBO sites 115 and 120, respectively. The process 400 explains the operation 325 in greater detail.

The process 500 describes a data telescoping process in which the central management system 140 identifies abnormal behavior based on the received data, and requests raw data from the local management system 160 to resolve or at least understand the cause of the abnormal behavior. Thus, upon starting at operation 505, the central management system 140 receives data from the local management system 160 at operation 510. As indicated above, the data that is received may be raw data, down sampled data, or a combination of raw and down sampled data. The central management system 140 may be configured to identify which data is raw or down sampled. For example, in some embodiments, a tag or flag may be associated with the data that is down sampled or raw. Other mechanisms may be employed to differentiate between and distinguish raw data and down sampled data. The central management system 140 stores all of the received data within a memory (e.g., the memory 155) at operation 515. The data may be stored within the memory for a designated period of time.

Additionally, the central management system 140 may analyze the received data at operation 520 to identify any abnormal behavior at the ROBO site 110 from which the data is received. For example, in some embodiments, the central management system 140 may identify data trends (e.g., from past received data) and determine deviations from those data trends. These data trends may be identified from raw data, down sampled data, or a combination of raw data and down sampled data. If the central management system 140 does not identify any abnormal behavior, the process 500 ends at operation 525 with the central management system 140 waiting for the next batch of data from the local management system 160. If the central management system 140 identifies an abnormal behavior at the operation 520, the central management system 140 may decide to investigate further. Thus, at operation 530, the central management system 140 determines whether the abnormal behavior is observed in down sampled data or raw data.

If the data is raw data, at operation 535, the central management system 140 performs one or more actions to address the abnormal behavior. For example, the central management system 140 may perform one or more troubleshooting actions, including updating the allocation of resources on the ROBO site 110, etc. If the central management system 140 determines, at the operation 530, that the data is down sampled, the central management system requests raw data from the local management system 160 corresponding to the down sampled data at operation 540. To request the raw data, the central management system 140 may zoom in on the down sampled data to identify a small window of time for which to request the raw data. For example, if the central management system 140 determines that the abnormal behavior occurred at 4:00 PM, the central management system may request raw data corresponding to a period of time before 4:00 PM to understand what led to the abnormal behavior. The central management system 140 may also request raw data for a period of time after 4:00 PM to determine what other impacts the abnormal behavior may have caused. The raw data that is requested may be the same category of data that shows the abnormal behavior or any other category of data.

Upon identifying the raw data to request and the window of that raw data, the central management system 140 may send a request to the local management system 160 via the network link 125 identifying the category of data and the window (e.g., time frame) at operation 545. The central management system 140 may receive the corresponding raw data and address the problem at the operation 535. Further, the local management system 160 upon receiving the request from the central management system 140 for the raw data, may retrieve the raw data, package the raw data, and send it to the central management system either right away or with the next scheduled transmission. The local management system 160 may also account for this request for raw data in updating the priorities for the next transmission.

It is to be understood that any examples used herein are simply for purposes of explanation and are not intended to be limiting in any way. It is also to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   by a local management system:
   assigning an initial priority to data collected from an associated remote office branch office;
   updating the initial priority of at least some of the data to an updated priority based upon historical data of a good connection for a time slot of a time window in a prior communication from the local management system to a central management system;
   selecting from the data having the initial priority and the at least some of the data having the updated priority a portion of the data having a highest priority;
   creating a data packet from the portion of the data having the highest priority for transmission from the local management system to the central management system; and
   selecting a size of the data packet to be transmitted to the central management system, wherein the size is determined based on a bandwidth and latency of a network connection between the remote office branch office and the central management system.

2. The method of claim 1, wherein the size of the data packet is further selected based on network link characteristics.

3. The method of claim 1, further comprising setting a transmission frequency for the data packet based on the time slot with the good connection.

4. The method of claim 3, wherein the transmission frequency identifies how many times to transmit the data packet within a given time period.

5. The method of claim 1, wherein the data packet comprises a first size in a first transmission and a second size in a second transmission, the first size being different from the second size.

6. The method of claim 1, wherein a frequency of transmitting the data packet to the central management system is based upon a network connection between the local management system and the central management system.

7. The method of claim 1, further comprising transmitting, by the local management system, the data packet to the central management system during a period of transmission set by the central management system.

8. The method of claim 1, further comprising:
   determining, by the local management system, that the central management system requests a first previous data with a first frequency and a second previous data with a second frequency, wherein the first frequency is greater than the second frequency; and
   assigning, by the local management system, a first data corresponding to the first previous data a higher priority than a second data corresponding to the second previous data.

9. The method of claim 1, wherein the updated priority assigned, by the local management system, to the data in a current transmission round becomes the initial priority of the data in a next transmission round.

10. A method comprising:
    computing, by a local management system associated with a remote office branch office, a frequency with which to transmit data collected from the remote office branch office to a central management system, wherein the frequency is variable by the local management system based upon a combination of a real-time and historic property of a network connection between the remote office branch office and the central management system, wherein the historic property includes historical data of a good connection for a time slot of a time window in a prior communication;
    transmitting, by the local management system, a data packet comprising at least a portion of the data from the remote office branch office to the central management system based on the frequency, wherein the frequency is further based upon a period of transmission set by the central management system; and
    selecting, by the local management system, a size of the data packet to be transmitted to the central management system, wherein the size is determined based on a bandwidth and latency of a network connection between the remote office branch office and the central management system.

11. The method of claim 10, further comprising compressing, by the local management system, the data packet before the transmission.

12. The method of claim 10, wherein the local management system computes the frequency before each round of transmission of the data to the central management system.

13. An apparatus comprising;
    a processing unit associated with a remote office branch office, wherein the processing unit comprises programmed instructions to:
    assign an initial priority to data collected from the remote office branch office;
    update the initial priority of at least some of the data to an updated priority based upon historical data of a good connection for a time slot of a time window in a prior communication from the local management system to a central management system;
    select from the data having the initial priority and the at least some of the data having the updated priority a portion of the data having a highest priority;
    create a data packet from the portion of the data having the highest priority for transmission from the remote office branch office to the central management system; and
    select a size of the data packet to be transmitted to the central management system, wherein the size is determined based on a bandwidth and latency of a network connection between the remote office branch office and the central management system.

14. The apparatus of claim 13, wherein the processing unit further comprises programmed instructions to transmit the data packet to the central management system during a first transmission time period that is different from a second transmission period during which a second remote office branch office sends second data to the central management system.

15. The apparatus of claim 13, wherein the latency of the network connection is based upon a time period between a previous successful transmission and a previous failed transmission.

16. The apparatus of claim 13, wherein the latency of the network connection is based upon a time period between a first previous time period when the network connection is in a connected state and a second previous time period when the network connection is in a disconnected state.

17. The apparatus of claim 13, wherein the remote office branch office is connected to the central management system via a wide area network link or a satellite communication link.

18. A non-transitory computer-readable media comprising computer-executable instructions embodied thereon that, when executed by a processor associated with a remote office branch office, cause the processor to perform a process comprising:
- computing a frequency with which to transmit data collected from the remote office branch office site to a central management system, wherein the frequency is variable by the processor based upon a combination of a real-time and historic property of a network connection between the remote office branch office and the central management system, wherein the historic property includes historical data of a good connection for a time slot of a time window in a prior communication;
- transmitting a data packet comprising at least a portion of the data from the remote office branch office to the central management system based on the frequency, wherein the portion of the data that is included in the data packet has a higher priority than the data that is not included in the data packet, and wherein the data that corresponds to previously requested data from the remote office branch office by the central management system has the higher priority than the data not previously requested by the central management system; and
- computing a size of the data packet based on a bandwidth and a latency of a network connection between the remote office branch office and the central management system.

19. The non-transitory computer-readable media of claim 18, wherein computing the size of the data packet is done before the transmission.

20. The non-transitory computer-readable media of claim 18, wherein the data packet comprises raw data, down sampled data, or a combination of raw data and down sampled data.

21. An apparatus comprising;
- a processing unit associated with a remote office branch office, wherein the processing unit comprises programmed instructions to:
  - compute a data packet size of a data packet for transmitting data collected from the remote office branch office to a central management system, wherein the data packet size is computed from a bandwidth and a latency of a network connection between the remote office branch office and the central management system;
  - assign a priority to the data packet based on historical data of a good connection for a time slot of a time window in a prior communication between the remote office branch office and the central management system;
  - create the data packet of the data packet size from a portion of the data collected from the remote office branch office for transmission from the remote office branch office to the central management system; and
  - compute the data packet size before each transmission of the data from the remote office branch office to the central management system.

22. The apparatus of claim 21, wherein the processing unit comprises programmed instructions to transmit the data packet to the central management system based upon a frequency computed before each transmission of the data.

* * * * *